United States Patent [19]

Mandarino et al.

[11] Patent Number: 5,375,750
[45] Date of Patent: Dec. 27, 1994

[54] ARTICLE CARRIER FOR AUTOMOTIVE VEHICLES

[75] Inventors: Ralph J. Mandarino, Grosse Pointe Farms; Jon D. Sparham, Pontiac; Thomas C. Nanney, Warren; Robert C. Kogelschatz, Marine City; Con J. Nolan, Bloomfield Hill, all of Mich.

[73] Assignee: MascoTech, Inc., Taylor, Mich.

[21] Appl. No.: 53,297

[22] Filed: Apr. 26, 1993

Related U.S. Application Data

[63] Continuation of Ser. No. 818,506, Jan. 8, 1992, abandoned, which is a continuation of Ser. No. 250,705, Sep. 28, 1988, abandoned.

[51] Int. Cl.$^5$ .............................................. B60R 9/00
[52] U.S. Cl. .................................... 224/321; 224/326
[58] Field of Search .............. 224/326, 325, 309, 324, 224/321

[56] References Cited

U.S. PATENT DOCUMENTS

| Re. 26,538 | 3/1969 | Bott . | |
|---|---|---|---|
| Re. 26,539 | 3/1969 | Bott | 224/326 |
| Re. 32,706 | 7/1988 | Bott . | |
| 2,121,531 | 6/1938 | Murphy | 74/110 |
| 4,132,335 | 1/1979 | Ingram | 224/326 |
| 4,225,068 | 9/1980 | Ingram . | |
| 4,239,138 | 12/1980 | Kowalski . | |
| 4,244,501 | 1/1981 | Ingram . | |
| 4,279,368 | 7/1981 | Kowalski . | |
| 4,372,469 | 2/1983 | Kowalski et al. . | |
| 4,406,386 | 9/1983 | Rasor et al. . | |
| 4,448,337 | 5/1984 | Cronce . | |
| 4,469,261 | 9/1984 | Stapleton et al. . | |
| 4,516,710 | 5/1985 | Bott . | |
| 4,616,772 | 10/1986 | Mareydt . | |
| 4,684,048 | 8/1987 | Bott . | |
| 4,754,905 | 7/1988 | Bott | 224/326 |

FOREIGN PATENT DOCUMENTS 672749 10/1964 Italy ..................................... 224/325

Primary Examiner—Linda J. Sholl
Attorney, Agent, or Firm—Leydig, Voit & Mayer, Ltd.

[57] ABSTRACT

An article carrier for an automotive vehicle or the like includes a pair of elongated side rails adapted to be mounted on an exterior body surface of the vehicle in spaced-apart parallel relation with the inboard sides thereof facing toward the longitudinal center line of the vehicle. Each of the side rails is formed with a transverse cross-section having a height greater than its width and an upper surface including a substantial portion thereof sloping downwardly and outwardly with respect to the vehicle center line. At least one article securing member is adapted to be mounted for longitudinal movement on each side rail and a mechanism is provided for selectively locking the article securing members in position along the side rails. A longitudinal molding element is adapted to be mounted on the exterior body surface along the outboard side of each side rail from adjacent the sloping upper surface portion thereof downwardly and outwardly to the exterior body surface for substantially filling the space defined therebetween to provide a streamlined aerodynamic and aesthetically pleasing appearance to the outboard sides of the side rails.

22 Claims, 4 Drawing Sheets

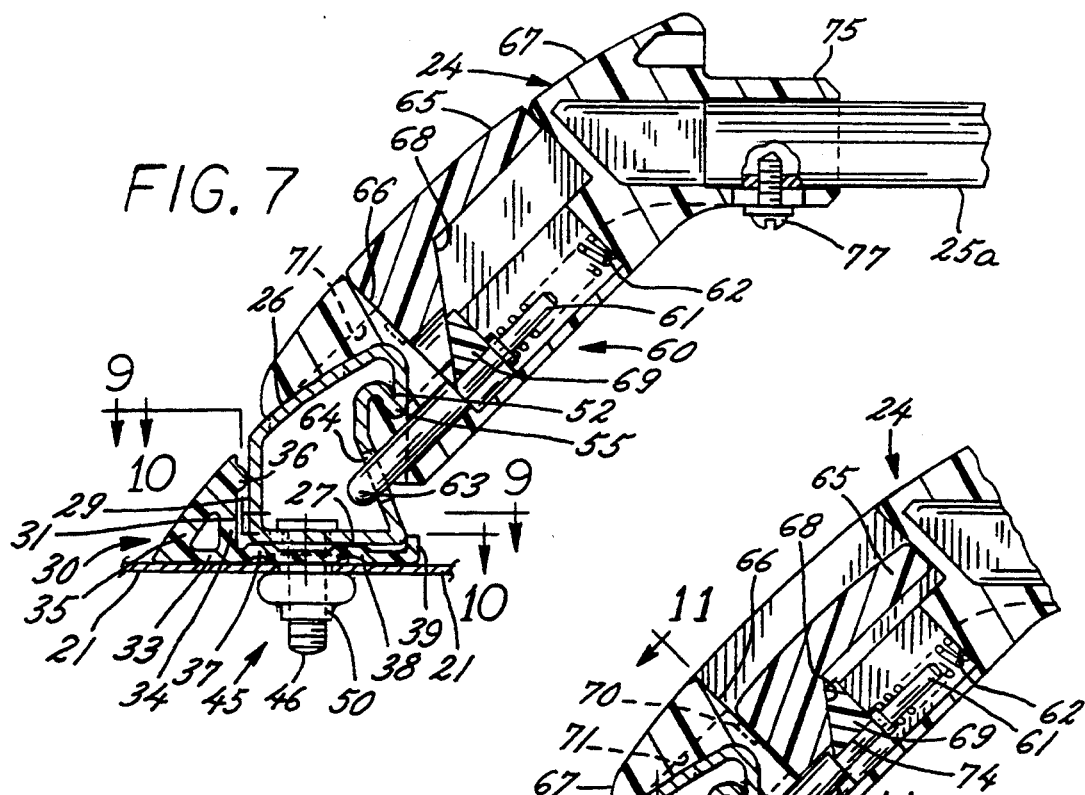
FIG. 7
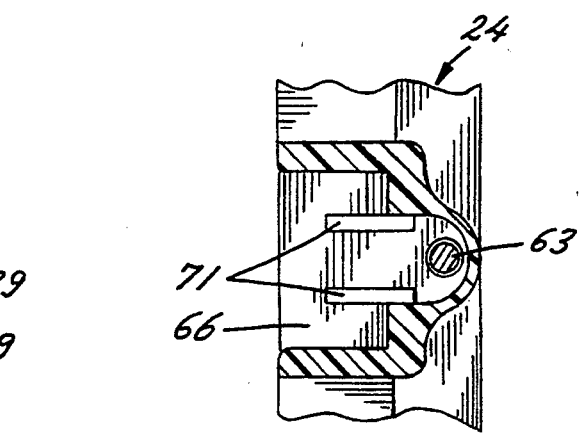
FIG. 8
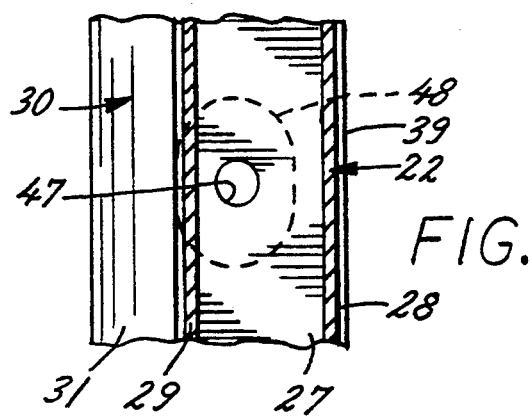
FIG. 9
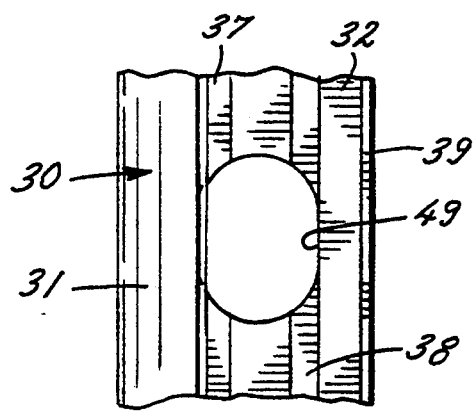
FIG. 10
FIG. 11

ARTICLE CARRIER FOR AUTOMOTIVE VEHICLES

This is a continuation of copending application Ser. No. 07/818,506, filed on Jan. 8, 1992, now abandoned which is a continuation of Ser. No. 07/250,705, filed on Sep. 28, 1988 (now abandoned).

FIELD OF THE INVENTION

The present invention relates generally to article carriers or luggage racks for mounting on an exterior body surface of automotive vehicles and the like.

BACKGROUND OF THE INVENTION

Racks for carrying luggage and other articles on an exterior surface of automobile vehicles and the like have become quite popular. Typically, such racks and carriers are mounted on the vehicle roof or rear trunk lid, although other surfaces are sometimes used, such as the upper surface of a cap or canopy for a pick-up truck.

There are many prior art patents on such luggage racks and article carriers. One general type rack employs raised side rails mounted substantially above the vehicle's surface on fixed stanchions with relatively flat intermediate skid strips or load supporting slats therebetween. Bott U.S. Pat. Re. Nos. 26,538 and 26,539 are examples of expired patents of this kind. Ingram U.S. Pat. No. 4,225,068; Kowalski U.S. Pat. Nos. 4,239,138 and 4,279,368 and Mareydt U.S. Pat. No. 4,616,772 are more recent examples disclosing luggage racks and carriers of this general type. Because the side rails are elevated above the roof surface, they create undesirable wind resistance and noise and because they are unsupported between the stanchions, their load carrying capacity is somewhat limited.

Another general type of rack or carrier that has met with some commercial acceptance employs relatively flat, low-profile slats along the sides on which stanchions connected to cross bars or article tie down members are mounted. Bott U.S. Pat. No. 4,516,710 and U.S. Pat. No. Re. 32,706 along with their issued parent patents and many of the numerous references cited therein are illustrative of this style rack. Other U.S. patents disclosing racks and carriers of this type are: Ingram U.S. Pat. No. 4,244,501; Kowalski et al. U.S. Pat. No. 4,372,469; Rasor et al. U.S. Pat. No. 4,406,386; Cronce U.S. Pat. No. 4,448,337; Stapleton et al. U.S. Pat. No. 4,469,261 and many of the references cited in these patents. The side slats disclosed in these patents are generally characterized as being substantially wider than they are high and have a substantially flat, horizontal upper article carrying surface.

For use with vehicles having roof surfaces with a more rounded contour, Bott U.S. Pat. Nos. 4,684,048 and 4,754,905 disclose carriers having supporting side slats with non-horizontal lower mounting surfaces and upwardly opening channels for receiving generally horizontally disposed liners with flat inwardly directed flanges for supporting articles and movable stanchions connected to cross bars. In these carriers, loads are transmitted down through the channel-shaped metal liners and into and through the plastic supporting slats which are relatively expensive to fabricate and limited in their strength capabilities.

OBJECTS AND SUMMARY OF THE INVENTION

It is one of the primary aims of the present invention to provide an article carrier for an automotive vehicle or the like having side rails that are higher than they are wide in order to afford improved strength and load carrying capacity compared to the relatively wide but thin side slats of the prior art. Another object of the invention is to provide a carrier wherein the side rails are mounted on the exterior body surface of the vehicle with only a relatively thin gasket therebetween that not only seals the space from rain and snow but also from air flow under the rails. A further and more detailed object is to assemble such a carrier with decorative trim moldings mounted outboard of the side rails in order to provide a streamlined aerodynamic and aesthetically pleasing appearance to the carrier side rails. Even more specifically, it is an object to provide a carrier with such a decorative side rail molding that is integrally formed with the elongated sealing gasket that underlies the side rail on the exterior surface of the vehicle.

Yet another object is to provide a carrier of the foregoing type wherein streamlined end caps are mounted on the exterior surface of the vehicle so as to partially support the side rails and also limit the longitudinal movement of article securing members mounted on the side rails. A still further object is to provide such a carrier having side rails with upper surfaces that slope downwardly and outwardly and wherein an external trim molding along the outboard side of the rail substantially continues the downwardly sloped portion to the vehicle surface.

Another object of the present invention is to provide an improved luggage rack system in which the article securing members mounted for longitudinal movement on the side rails are provided with push button locking devices for locking the members at intermittent locations along the side rails. A related and still more detailed object is to provide such push button locking devices with a relatively smooth outer surface disposed substantially flush with the outer surface of the article securing member when the push button is in its normal position. Yet another object is to provide such push button locking devices with a spring biased cam actuating mechanism having substantially non-stick cam engaging surfaces.

Accordingly, the article carrier of the present invention includes a pair of elongated side rails adapted to be mounted on an exterior body surface of a vehicle in spaced-apart parallel relation with the inboard sides thereof facing toward the longitudinal center line of the vehicle. Each of the side rails is formed with a transverse cross-section having a height greater than its width and an upper surface including a substantial portion thereof sloping downwardly and outwardly with respect to the vehicle center line. At least one article securing member is adapted to be mounted for longitudinal movement on each side rail and a mechanism is provided for selectively locking the article securing members in position along the side rails. A longitudinal molding element is adapted to be mounted on the exterior body surface along the outboard side of each side rail from adjacent the sloping upper surface portion thereof downwardly and outwardly to the exterior body surface for substantially filling the space defined therebetween to provide a streamlined aerodynamic and aesthetically pleasing appearance to the outboard sides of the side rails.

Preferably, the article carrier includes end caps adapted to be mounted on the exterior body surface at least at one end of each side rail for partially supporting the side rail and for limiting the extent of longitudinal movement of the article securing members thereon in at least one direction. The longitudinal molding includes a substantially flat gasket portion adapted to be interposed between the lower surface of the side rail and the exterior body surface for substantially sealing the space therebetween, and the end cap includes a substantially flat platform portion adapted to be interposed between the lower surface of the side rail at one end thereof and the exterior body surface of the vehicle. The gasket portion of the molding and the platform portion of the end cap are substantially the same thickness.

In the illustrated embodiment, the article carrier includes a retractable lock pin carried by the article securing member and a plurality of apertures are formed in the side rails at intermittent locations along the length thereof, each aperture being dimensioned and disposed to receive the tip portion of one of the retractable lock pins therein. Preferably, a push button having a cam surface thereon is provided, the retractable lock pin is carried in the article securing member by a cam follower element engageable with the cam surface and a spring is provided for normally biasing the cam follower into engagement with the cam surface and for urging the retractable pin into locking position.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 1 is a partial perspective view of an article carrier of the present invention installed on the upper exterior body surface of an automobile vehicle or the like;

FIG. 7 is a still further enlarged vertical section of the side rail and article supporting member substantially as seen along line 7—7 in FIG. 3 with the retractable locking pin in locked position;

FIG. 8 is a fragmentary section similar to FIG. 7 showing the lock pin in retracted position;

FIGS. 9 and 10 are fragmentary horizontal sections through the side rail and integral side molding and gasket element substantially as seen along lines 9—9 and 10—10, respectively in FIG. 7;

FIG. 11 is a partial section of the locking pin substantially as seen along line 11—11 in FIG. 8;

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1:
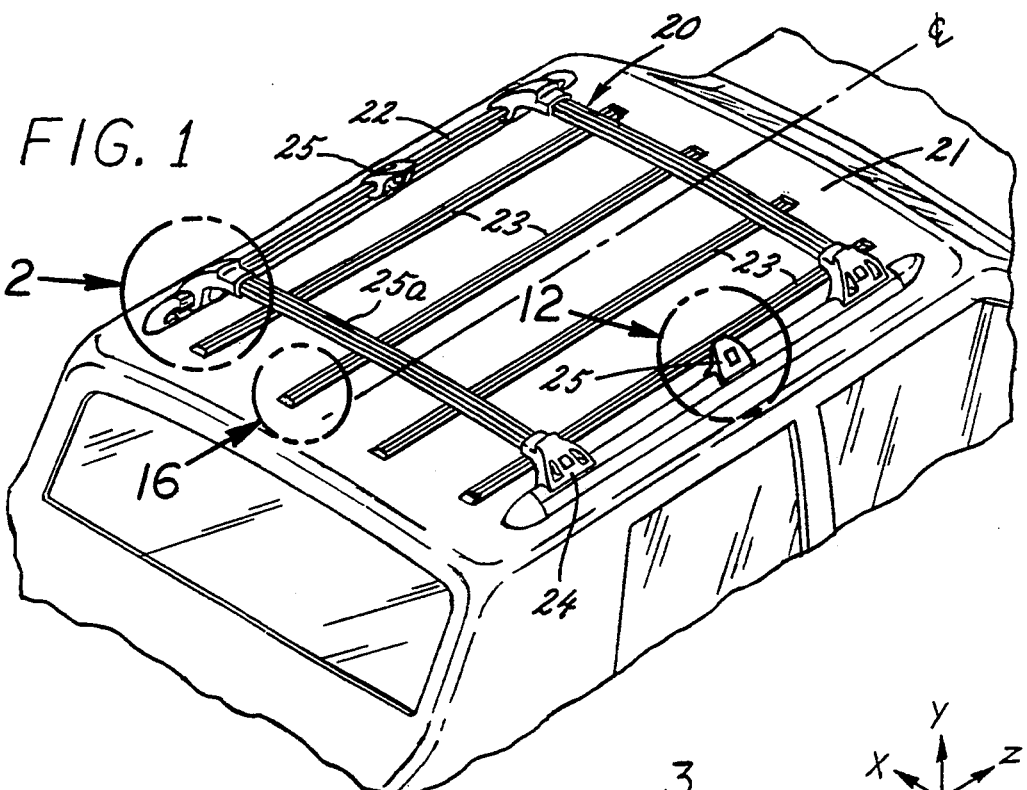
Figure 2:
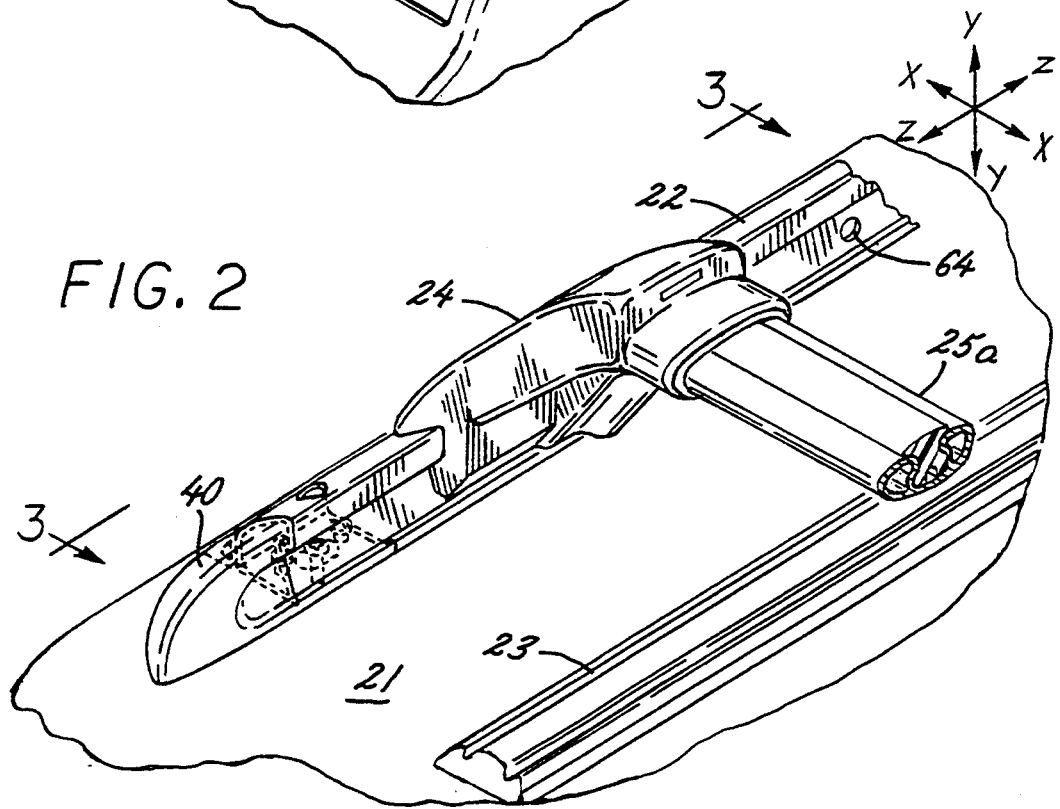
FIG. 2 is an enlarged detail of the circled area 2 in FIG. 1 showing a fragmentary perspective view of one of the side rails, end caps and article supporting members of the carrier of FIG. 1.

Turning now to the drawings, there is shown in FIG. 1, an article carrier or luggage rack 20 of the present invention mounted on the exterior body surface 21 of an automobile vehicle or the like. In the embodiment illustrated in FIG. 1, the carrier 20 is shown mounted on the roof portion of the vehicle, but it should be understood that the carrier 20 of the present invention may also be mounted on other suitable exterior vehicle surfaces such as a trunk lid, for example.

The article carrier 20 includes a pair of elongated side rails 22 adapted to be mounted on the vehicle body surface 21 in spaced-apart parallel relation with respect to the longitudinal center line of the surface 21. As shown in FIG. 1, a plurality of elongated skid strips 23 are adapted to be mounted in spaced-apart parallel relation intermediate the side rails 22. It will be understood that the skid strips 23 are adapted to not only directly support articles or luggage placed within the carrier 20, but also protect the exterior vehicle surface 21 from being marred or scratched by such articles, luggage and the like.

Mounted on each of the side rails 22 are at least one and preferably a plurality of article securing members 24 and 25. In the preferred embodiment, the article securing members 24 are in the form of stanchions mounted on each of the side rails 22 and supporting raised cross bars 25a between them. As will be described in more detail hereinafter, the article securing members 25 are in the form of tie down members mounted on each of the side rails 22.

As more particularly shown in FIGS. 2-4 and 7, each of the side rails 22 is formed with an upper supporting surface 26, a lower mounting surface 27 and inboard and outboard sides 28 and 29, with respect to the center line of the vehicle surface 21. It will be understood that each elongated side rail 22 also has a substantially longitudinally extending z axis which is intersected at right angles thereto by a substantially horizontally extending x axis and a substantially vertically extending y axis.

Figure 13:
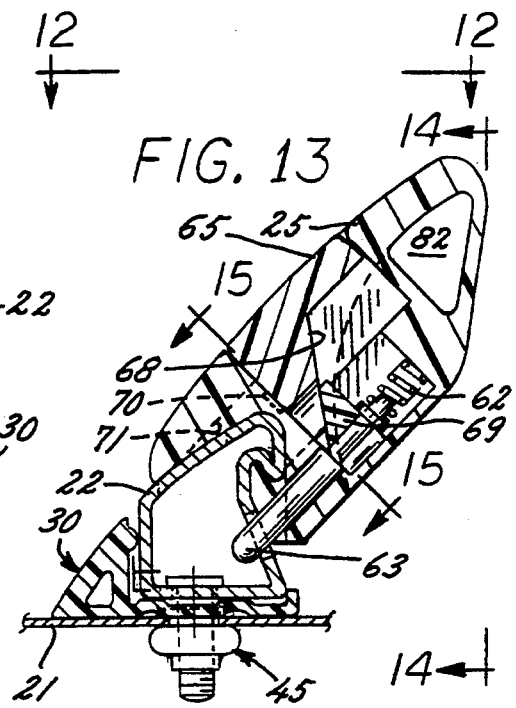
FIG. 13 is a vertical section substantially as seen along line 13—13 in FIG. 12.
Figure 14:
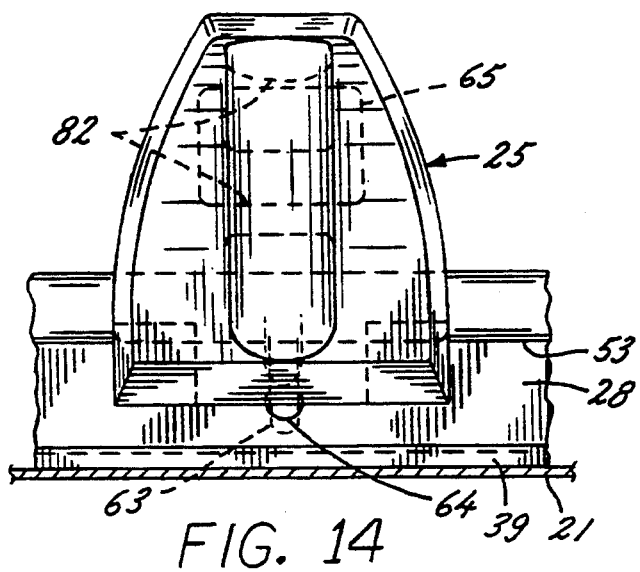
FIGS. 14 and 15 are sections substantially as seen along lines 14—14 and 15—15, respectively through the article tie down element in FIG. 13.
Figure 15:
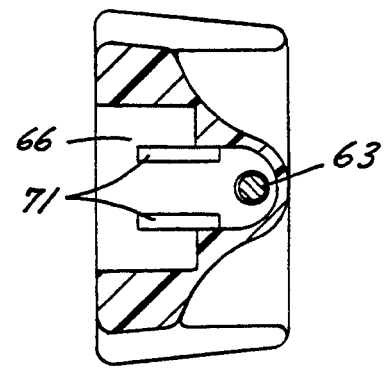
Figure 16:
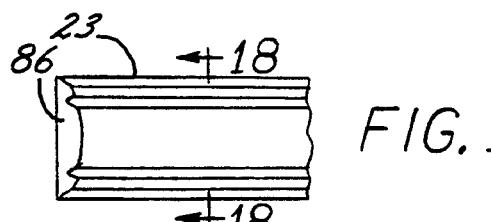
FIG. 16 is an enlarged detail of the circled area 16 in FIG. 1 showing a fragmentary top plan view of an end of one of the skid strips of the article carrier of FIG. 1.
Figure 17:
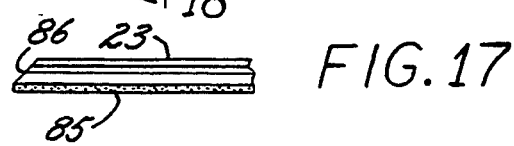
FIG. 17 is a fragmentary side elevation of the side strip of FIG. 16.
Figure 18:
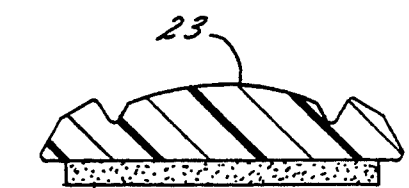
FIG. 18 is an enlarged vertical section of the skid strip substantially as seen along line 18—18 in FIG. 16.

In accordance with the present invention, each of the side rails 22 is formed with a transverse cross-section having a height greater than its width and the upper surface 26 is formed with a substantial portion thereof sloping downwardly and outwardly with respect to the center line of the vehicle surface 21 and the longitudinal axis z of the side rail 22. Thus, as seen in FIG. 7, each side rail 22 is formed with an asymmetrical transverse cross-sectional shape and it will be understood that the inboard sides 28 of the respective side rails are adapted to be mounted on the vehicle surface 21 in facing relationship with respect to the center line. It will be appreciated that by making the side rails 22 higher than they are wide, they have greater resistance to vertical bending and, therefore, greater load carrying capacity as compared to the relatively wide and flat slat-like side elements of the prior art such as disclosed in the aforementioned Bott U.S. Pat. No. 4,516,710 and other similar prior art slat-like structures. As best shown in FIGS. 7 and 13, the outboard side 29 of each side rail 22 is substantially one-half the height of the rail as measured from the lower surface 27 to the uppermost point of the upper surface 26.

Figure 3:
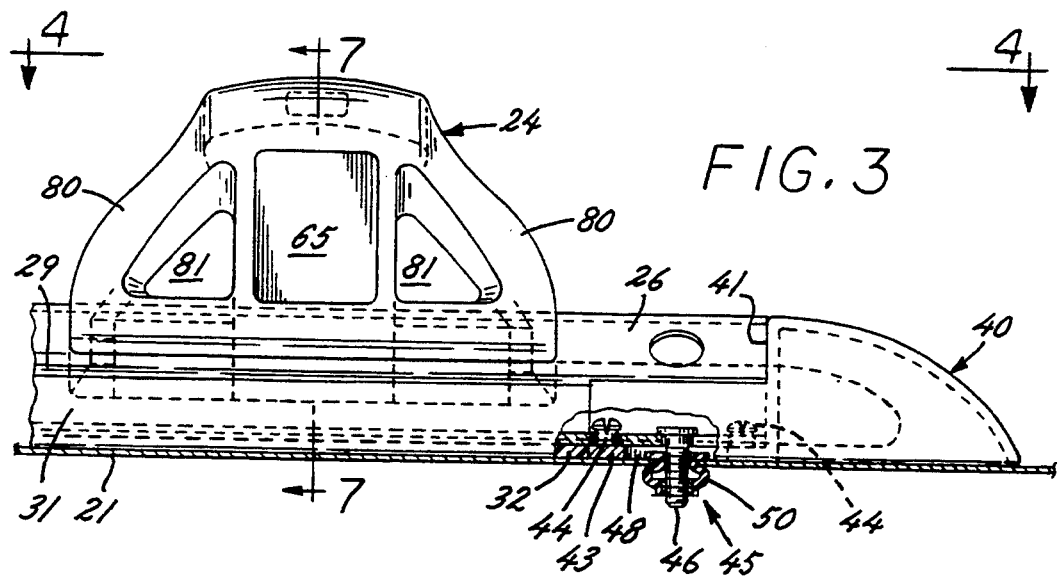
FIG. 3 is an enlarged fragmentary side elevation of the side rail, end cap and article supporting member substantially as seen along line 3—3 in FIG. 2.
Figure 4:
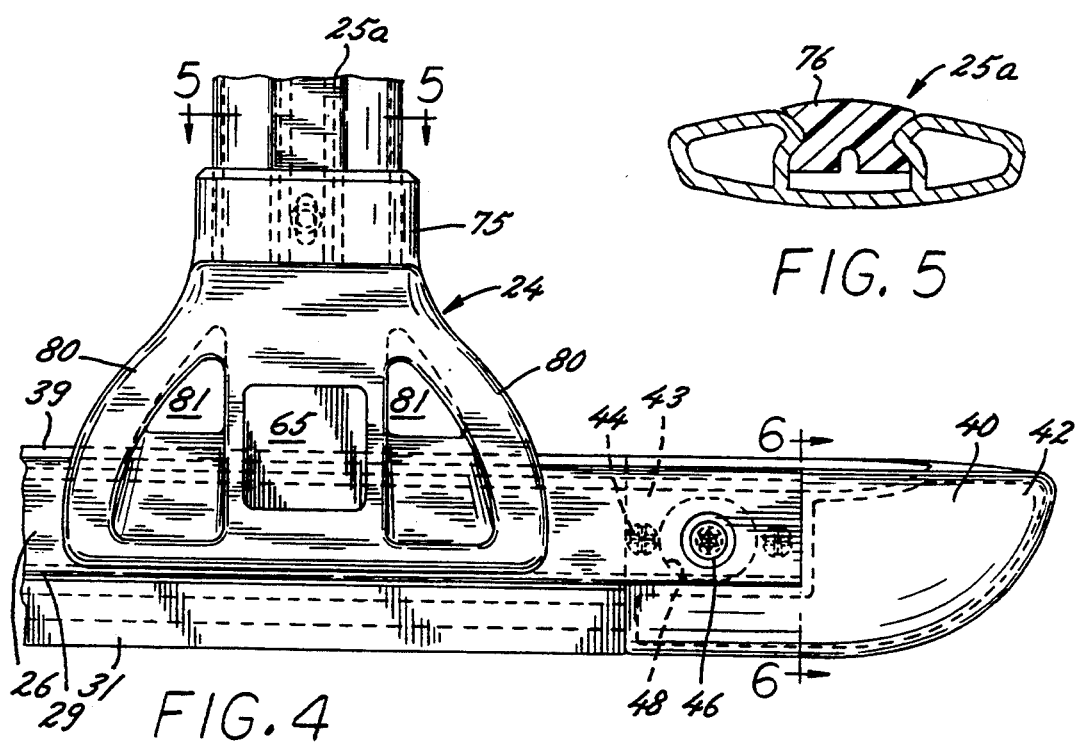
FIG. 4 is an enlarged fragmentary plan view of the side rail, end cap and article supporting member substantially as seen along line 4—4 in FIG. 3.

Pursuant to another aspect of the present invention, longitudinal trim means indicated generally at 30 is adapted to be mounted on the exterior vehicle surface 21 along the outboard side 29 of each side rail 22 from adjacent the sloping upper surface 26 downwardly and outwardly therefrom to the exterior vehicle surface 21 for substantially filling the space defined therebetween to provide a streamlined aerodynamic and aesthetically pleasing appearance to the outboard sides 29 of the side rails. As shown in FIGS. 3, 4 and 7, in the preferred embodiment, the trim means 30 includes a longitudinally extending molding portion 31 mounted on the outboard side 29 of the side rail 22 and a generally flat, horizontally extending gasket portion 32 adapted to be interposed between the lower surface 27 of the side rail 22 and the exterior body surface 21 of the vehicle for substantially sealing the space therebetween.

Preferably, the longitudinal molding portion 31 and the substantially flat gasket portion 32 of the trim means 30 are integrally formed from a resilient elastomeric material such as PVC by a continuous extrusion process. In the illustrated embodiment shown in FIG. 7, the molding portion 31 is generally triangular in shape in transverse cross-section with a generally horizontal leg 33 that merges into the gasket portion 32 and a generally vertical leg 34 disposed alongside the outboard side 29 of the side rail 22. The third leg or hypotenuse 35 of the triangular shaped molding 31 preferably forms a substantial continuation of the downwardly sloping upper surface 26 of the side rail 22 and thus forms a smooth side trim down to the exterior vehicle surface 21. The vertical leg 34 of the molding 31 desirably includes a longitudinally extending bead 36 for sealingly engaging with the upstanding outboard side wall 29 of the side rail 22 to facilitate sealing therebetween.

In order to better seal and cushion the side rail 22 on the vehicle surface 21, the gasket portion 32 of the trim means 30 is preferably formed with a pair of longitudinally extending ribs 37 and 38 which engage the lower surface 27 of the side rail 22. Also, the gasket portion 32 is formed with a longitudinally extending, upstanding lip portion 39 which engages and seals against the inboard side 28 of the side rail 22. Thus the combination trim molding 31 and gasket 32 not only serves as an aesthetically pleasing trim means 30 for the side rail 22 but also seals the space between the side rail 22 and the vehicle surface 21 from snow and rain as well as from the flow of air therebetween. Thus, the trim means also functions aerodynamically to reduce wind noise and whistle along and beneath the side rail 22.

In accordance with a further feature of the present invention, streamlined end caps 40 are provided for at least partially supporting the ends of the side rails 22 on the vehicle surface 21 and for providing an aesthetically pleasing appearance to the ends of the side rails 22 as well as for the aerodynamic flow of air thereover. As seen in FIGS. 1-4 and 6, the end caps 40 are formed with a butt portion 41 having generally the same transverse cross-section as the side rail 22 and the combination trim piece 30, molding 31 and gasket 32, when in assembled relationship. The end caps 40 have a tip portion 42 which extends longitudinally away from the butt portion 41 and, preferably, is curved downwardly and outwardly therefrom to form a smoothly curved exterior surface in both the longitudinal and transverse directions.

To provide support for the side rail 22, the end cap 40, in the preferred embodiment, also includes a flat, generally horizontal platform portion 43 which extends in the opposite longitudinal direction from the tip portion 42. The platform portion 43 of the end cap 40 is adapted to be interposed between the lower surface 27 of the side rail 22 and the exterior surface 21 of the vehicle. Preferably, connecting means 44 are provided for securing the end caps 40 to the side rails 22 before the side rails are mounted on the exterior vehicle surface 21. This permits pre-assembly of these elements together by the supplier prior to installation on the vehicle. As shown in the preferred embodiment illustrated in FIGS. 3 and 4, the connecting means 44 comprise a pair of upstanding lugs or bosses integrally formed on the platform portion 43 of the end cap so as to pass through and be captured in mating holes formed in the end of the lower mounting surface 27 of the side rail. Preferably, the projecting ends of the lugs 44 are upset or riveted over to firmly secure the end caps 40 to the side rails 22. It will be understood, however, that separate connecting means such as sheet metal screws or metal or plastic rivets may be used, if desired.

Also in keeping with the present invention, the thickness of the flat platform portion 43 of the end cap 40 and the flat gasket portion 32 of the trim means 30 are formed having substantially the same thickness. Thus, the side rails 22 are not only firmly mounted on the exterior surface 21, and supported in part by the platform portions 43 of the end caps, but are sealed and resiliently supported thereon by the gasket portions 32 of the trim means 30. Moreover, the downwardly and outwardly sloping outer surface of the longitudinal molding portion 31 and the downwardly and outwardly sloping tip portions 42 of the end caps 40 provide the side rails with an aerodynamic and aesthetically pleasing appearance from end to end as well as along the outboard sides thereof.

To secure the side rails 22, end caps 40 and combination trim moldings 31 and gasket portions 32 to the vehicle surface various fastening means and/or adhesive systems may be employed. Thus, for example, various contact adhesives may be directly applied to the mating surfaces of these parts for securing them together. Alternatively, and as shown in the preferred embodiment, fastening means 45 in the form Torx-head screws 46 inserted through appropriate openings 47, 48 and 49 in the lower mounting surface 27 of the side rail 22, the platform portion 43 of the end cap 40 and the gasket portion 32 of the trim strip 30, respectively, may be threaded into Wel-nuts or Riv-Nuts 50 which pass through and are captured in openings in the surface of the vehicle as has become common in the automotive industry (See FIG. 3).

Pursuant to another feature of the present invention, the side rails 22 and article securing members 24, 25 are formed with complementally shaped engaging means for resisting rotation of the article securing members with respect to the x, y and z axes of the side rails 22 while permitting longitudinal movement thereon. In the preferred embodiment, and as illustrated in the drawings, the side rails 22 are each formed with a longitudinally extending open jaw portion 52 including a downwardly depending tongue 53 and an upwardly extending groove 54 on the inboard side 28 thereof. Similarly, the article securing members 24, 25 are preferably formed with open jaw portions 55 including upwardly extending tongue portions 56 and downwardly extending grooves 57 which interfit with the complementally-shaped jaws 52 of the side rails 22.

To lock the article securing members 24, 25 at selected positions along the side rails 22, manually operated locking means 60 are provided. In the preferred embodiment, each article securing member 24, 25 carries a retractable locking pin 61 which is biased by a spring 62 into locking position wherein the tip 63 of the pin 61 projects into one of a series of apertures 64 formed in and spaced along the length of the inboard side 28 of side rail 22.

For retracting the pins 61 from the apertures 64, a manual push button 65 is mounted in an opening 66 in the outboard surface 67 of each of the article securing members 24, 25. In the illustrated embodiment, the push button 65 is formed with a downwardly and inwardly inclined cam surface 68 that engages a cam follower element 69 surrounding the retractable pin 61. As the button 65 is pushed in from the position shown in FIG. 7, for example, the cam follower element 60 rides up on the sloping cam surface 68 of the button and raises the lock pin 61 against the bias of the spring 62 to the position shown in FIG. 8. It will be understood, of course, that when the button is released, the spring 62 urges the pin 61 toward its locked position with its tip 63 inserted into one of the apertures 64, provided the pin and aperture 64 are in alignment. The spring 62 also biases the cam follower element 69 downwardly and urges the push button 65 back to its normal position with its flat outer face substantially flush with the outboard surface of the article securing member 24, 25.

Preferably, the article securing members 24, 225 are inclined upwardly and inwardly with respect to the z axis of the side rails and have substantially smooth outer surfaces, at least in the longitudinal central portion thereof where the flat outer ends of the push buttons 65 are located. Thus, not only are the outer surfaces of the article securing members substantially smooth and flush to the effects of wind, snow and rain, but the internal parts of the locking means including the cam surfaces 68 cam followers 69 and locking pins 61 are substantially shielded and protected from the elements. This substantially prevents icing and freezing up of the locking means and also substantially prevents the entry of dust and dirt therein which may cause the pins 61 and push buttons 65 to stick. Preferably, the cam surfaces 68 and cam followers 69 are made of substantially non-sticking plastic materials such as Nylon, for example.

To guide the sliding movement of the push buttons 65 and also prevent the accidental withdrawal thereof, the underside of the push button is formed with a pair of integral guide pins 70 that project into a pair of spaced apart guide grooves 71 formed in the lower deck 72 of the button slide opening 66 formed in the article securing members 24, 25. Preferably, the push button 65 is inserted into the slide opening 66 from the inboard side of the article securing member 24, 25, the cam follower 69 is inserted and then the retractable pin 61 is snapped into a key-hole shaped opening 74 formed in the cam follower. The entire locking means is thus held captive in the slide opening 66.

As previously mentioned, in the illustrated embodiment, the article securing members 24 are in the form of stanchions mounted for longitudinal movement on the side rails 22 and supporting cross bars 25a therebetween. It will also be seen that the butt portion 41 of the end caps 40 abuts the end the side rail 22 so as to limit the extent of longitudinal movement of the article securing members 24, 25 along the side rail in the direction of the respective end caps 40.

Figure 5:
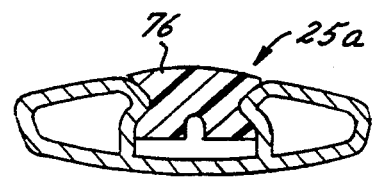
FIGS. 5 and 6 are cross sections of the upper cross bar and the side rail end cap substantially as seen along lines 5—5 and 6—6, respectively in FIG. 4.
Figure 6:
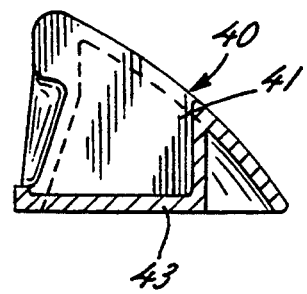
Figure 12:
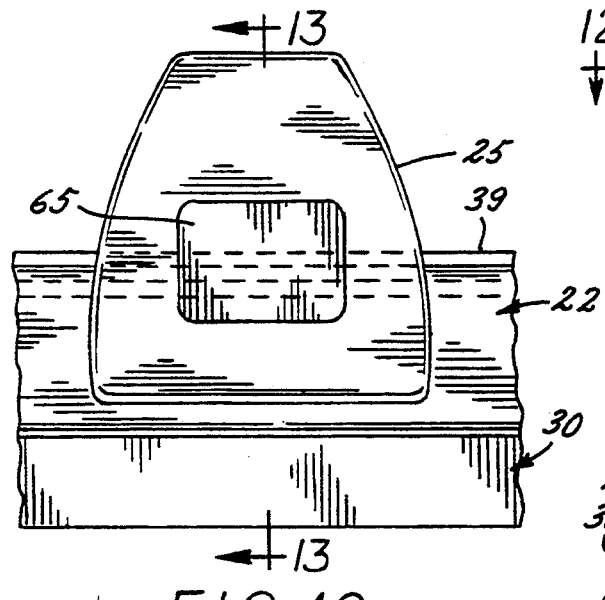
FIG. 12 is an enlarged fragmentary top plan view of the area circled 12 in FIG. 1 showing one of side rails and the article tie down members of the carrier of FIG. 1.

Referring to FIGS. 1-5, it will be seen that the upper end of each stanchion 23 is formed with an elliptically shaped collar portion 75 having an opening therein for receiving an end of the cross bar 25a, which is generally oval in cross-section (See FIG. 5). The cross bar 25a includes a relatively thin-walled metal beam portion which may be of either extruded or roll-formed construction and is formed with an upper groove for receiving a resilient insert member 76 which extends along the length of the cross bar 25a. A suitable fastener, such as a self-tapering screw 77 is used to secure the cross bar 25a to the collar portion 75 of the stanchion 24.

In the preferred embodiment, each of the stanchions 24 also includes a pair of downwardly directed legs 80 spaced apart longitudinally with respect to the centrally located push button 65. Thus, as shown in FIGS. 3 and 4, a pair of article securing openings 81 are formed in the stanchions 23 between the push button 65 and the legs 80. These openings 81 are useful for receiving hooks, ropes or elastic tie down straps for securing articles to the carrier 20.

Referring to FIGS. 12-15, the article securing members 25 are preferably in the form of tie-down elements mounted for longitudinal movement on the side rails 22. Each of the tie-down elements 25 includes an aperture 82 at its upper inner end which is similarly useful for receiving a hook, rope end or an elastic strap for securing articles or luggage in the carrier 20. The retractable pin locking mechanism 60 of the tie down element 25 is generally the same as for the stanchion members 24 although the push buttons may be slightly smaller in size.

As shown in FIGS. 1, 2 and 16-18, the intermediate skid strips 23 are generally flat, slat-like elements and may be formed of an extruded PVC material. In the illustrated embodiment, the skid strips 23 are mounted directly on the vehicle surface 21 by a layer of adhesive material 85. Preferably, both the front and rear ends 86 of the skid strips are tapered downwardly and outwardly toward the vehicle surface 21 which also gives the skid strips a pleasing aesthetic and aerodynamic appearance.

The side rails 22 may be made of extruded aluminum (as shown) or of roll-formed sheet metal, if desired. The article securing members 24, 25 and end caps 40 are preferably made of nylon 101 such as "Zytel."

We claim as our invention:

1. An article carrier for an automotive vehicle having an exterior body surface with a longitudinal center line, comprising in combination, a pair of elongated side rails each having upper and lower surfaces and inboard and outboard sides, said side rails adapted to be mounted on said exterior body surface in spaced-apart apart parallel relation, said inboard sides facing toward said center line and having a longitudinally extending open jaw portion including a downwardly depending tongue and a downwardly opening groove formed therein, each of said side rails being formed with a transverse cross-section having a height greater than its width and an offset upper peak portion disposed substantially above said exterior body surface, said upper surface including a load bearing and stanchion supporting portion thereof sloping downwardly and outwardly with respect to said peak portion and said center line, said outboard side being substantially one-half the height of said side rail as measured from said lower surface to the uppermost point of said upper peak portion thereof, said outboard side adapted to be disposed substantially perpendicular to said exterior body surface and interconnecting said sloping upper surface portion and said lower surface of said side rail, each of said side rails having a plurality of longitudinally spaced apertures therein, at least one stanchion adapted to be mounted for engagement with and longitudinal movement on said downwardly and outwardly sloping load bearing and stanchion supporting upper surface portion of each of said side rails, said at least one stanchion having complementally shaped engaging means including an interfitting jaw portion formed with respective tongue and groove portions substantially opposed to said downwardly depending tongue and said downwardly opening groove formed on said inboard side of said side rails for resisting relative rotation of said at least one stanchion with respect to said side rails while permitting said longitudinal movement thereon, means including a latching member carried by said at least one stanchion and having one end thereof engageable and disengageable with said apertures for selectively locking said at least one stanchion at predetermined positions along said side rails, spring means for biasing said one end of said latching member into engagement with one of said apertures when said latching member is aligned therewith, a push button carried by said at least one stanchion and being manually movable from a latching position to an unlatching position, said push button having an exposed manually engageable surface, camming means extending between and operatively connecting said latching member and said push button for moving said one end of said latching member against the biasing force of said spring means and out of engagement with said one of said apertures incident to said push button being manually moved to said unlatching position, said at least one stanchion having an outer surface and including an outwardly opening recess therein, said push button being disposed in said recess for movement laterally inwardly and outwardly relative to said outer surface between said latching and unlatching positions, said spring means being operative for biasing and moving said one end of said latching member into self-locking engagement with said one of said apertures and said exposed manually engageable surface of said push button into substantially flush relation to said outer surface of said at least one stanchion upon the manual release of said push button by an operator when said one end of said latching member is aligned with said one of said apertures, and trim means including a longitudinal molding element adapted to be mounted on said exterior body surface along said outboard side of each of said side rails from adjacent said sloping upper surface portion thereof downwardly and outwardly to said exterior body surface for substantially filling the space defined therebetween to provide a streamlined aerodynamic and aesthetically pleasing appearance to said outboard sides of said side rails.

2. An article carrier as defined in claim 1 wherein said trim means includes a substantially flat gasket portion adapted to be interposed between said lower surface of said side rail and said exterior body surface for sealing the space therebetween.

3. An article carrier as defined in claim 3 wherein said longitudinal molding element and said gasket portion are integrally formed from a resilient elastomeric material, 4. An article carrier as defined in claim 1 including end cap means adapted to be mounted on said exterior body surface at least at one end of each of said side rails for partially supporting said side rails and for limiting the extent of said longitudinal movement of said at least one stanchion thereon in at least one direction.

5. An article carrier as defined in claim 4 wherein said longitudinal trim means includes a substantially flat gasket portion adapted to be interposed between said lower surface of said side rail and said exterior body surface for substantially sealing the space therebetween and said end cap means includes a substantially flat platform portion adapted to be interposed between said lower surface of said side rail at said one end thereof and said exterior body surface of said vehicle.

6. An article carrier as defined in claim 5 wherein said gasket portion and said platform portion of said end cap are of substantially the same thickness.

7. An article carrier as defined in claim 4 wherein said end cap means includes a substantially flat platform portion adapted to be interposed between said lower surface of said side rail at said one end thereof and said exterior body surface of said vehicle and including fastening means for connecting said end cap means and said one end of said side rail together.

8. An article carrier as defined in claim 7 wherein said fastening means includes one or more elements for connecting said platform portion of said end cap means and said one end of said side rail together in preassembled relation prior to the mounting thereof on said exterior body surface of said vehicle.

9. An article carrier for an automotive vehicle having an exterior body surface with a longitudinal center line, comprising in combination, a pair of elongated side rails each having upper and lower surfaces and inboard and outboard sides, said side rails adapted to be mounted on said exterior body surface in spaced-apart parallel relation with said inboard sides facing toward said center line, each of said side rails being formed with a transverse cross-section having a height greater than its width, said upper surface including a substantial portion thereof sloping generally downwardly and outwardly with respect to said center line and said outboard side being substantially one-half the height of said side rail as measured from said lower surface to the uppermost point of said upper surface, said outboard side being adapted to be disposed substantially perpendicular to said exterior body surface and interconnecting said sloping upper surface portion and said lower surface of said side rail, at least one article securing member adapted to be mounted for longitudinal movement on each of said side rails, means including a latching member carried by said at least one article securing member and having one end thereof engageable and disengageable with said apertures for selectively locking said at least one article securing member at predetermined positions along said side rails, spring means for biasing said one end of said latching member into engagement with one of said apertures when said latching member is aligned therewith, a push button carried by said at least one article securing member and being manually movable from a latching position to an unlatching position, said push button having an exposed manually engageable surface, camming means extending between and operatively connecting said latching member and said push button for moving said one end of said latching member against the biasing force of said spring means and out of engagement with said one of said apertures incident to said push button being manually moved to said unlatching position, said at least one article securing member having an outer surface and including an outwardly opening recess therein, said push button being disposed in said recess for movement laterally inwardly and outwardly relative to said outer surface between said latching and unlatching positions, said spring means being operative for biasing and moving said one end of said latching member into self-locking engagement with said one of said apertures and said exposed manually engageable surface of said push button into substantially flush relation to said outer surface of said at least one article securing member upon the manual release of said push button by an operator when said one end of said latching member is aligned with said one of said apertures, and trim means including a longitudinal molding element adapted to be mounted on said exterior body surface along said outboard side of each of said side rails from adjacent said sloping upper surface portion thereof generally downwardly and outwardly to said exterior body surface for substantially filling the space defined therebetween, each of said longitudinal molding elements being generally triangularly shaped in transverse cross-section with a generally vertical leg of substantial height disposed along said perpendicularly disposed outboard side of said side rail and having a hypotenuse disposed to form substantially a continuation of said sloping upper surface portion of said side rail to provide a streamlined aerodynamic and aesthetically pleasing appearance to said outboard sides of said side rails.

10. An article carrier as defined in claim 9 wherein said at least one article securing member and each of said side rails are formed with complementally shaped engaging means for resisting relative rotation of said at least one article securing member with respect to said side rails while permitting said longitudinal movement thereon.

11. An article carrier as defined in claim 10 wherein said complementally shaped engaging means of said at least one article securing member and each of said side rails include a pair of interfitting jaws formed with substantially opposed tongue and groove portions.

12. An article carrier as defined in claim 9 wherein said side rails have a longitudinally extending open jaw portion including a downwardly depending tongue and a downwardly opening groove formed on said inboard side.

13. An article carrier as defined in claim 9 wherein said outer surface of said at least one article securing member is disposed substantially parallel to said side rails and said movement of said push button is substantially perpendicular to said outer surface of said at least one article securing member when said push button is moved to said unlatching position.

14. An article carrier as defined in claim 9 wherein said push button is formed with at least one detent projecting outwardly generally perpendicularly to the axis of the button and recess so as to limit the outward movement of the button in the recess.

15. An article carrier as defined in claim 14 wherein said push button is disposed for sliding movement in said recess and is formed with a pair or detents projecting outwardly generally perpendicularly from the lower slide surface thereof and said recess is formed with a pair of guide grooves for receiving said pair of detents to limit the outward extent of sliding movement of said button in said recess.

16. An article carrier as defined in claim 9 wherein said latching member is in the form of an elongated, generally cylindrical lock pin.

17. An article carrier as defined in claim 9 including a cross bar and wherein said at least one article securing member is a stanchion mounted for longitudinal movement on one of said side rails and supports one end of said cross bar.

18. An article carrier as defined in claim 9 wherein said at least one article securing member is a tie down element adapted to be slidably mounted on one of said side rails and includes at least one opening therein to receive a tie down strap.

19. An article carrier as defined in claim 9 wherein said camming means includes a cam member secured to said latching member and an inclined cam operator secured to said push button and engaging said cam member.

20. An article carrier as defined in claim 19 wherein said latching member is formed with a recessed portion intermediate the ends thereof and said camming member includes a U-shaped aperture at one end, said recessed portion of said latching member being disposed within said U-shaped aperture.

21. An article carrier as defined in claim 9 wherein said at least one article securing member includes means defining a cavity therein for receiving and supporting one end of said spring means and said latching member includes a shoulder portion abutting the other end of said spring means.

22. An article carrier as defined in claim 21 wherein said spring means is disposed partially about one end of said latching member and is preloaded by contact between said camming member and said inclined cam operator.

* * * * *